United States Patent [19]

Weaver et al.

[11] 4,425,645

[45] Jan. 10, 1984

[54] DIGITAL DATA TRANSMISSION WITH PARITY BIT WORD LOCK-ON

[75] Inventors: Charles S. Weaver; John M. Yarborough, Jr., both of Palo Alto, Calif.

[73] Assignee: SRI International, Menlo Park, Calif.

[21] Appl. No.: 311,783

[22] Filed: Oct. 15, 1981

[51] Int. Cl.³ .............................................. H04L 7/00
[52] U.S. Cl. ....................................... 371/47; 371/49; 375/106
[58] Field of Search ............................ 371/47, 49, 42; 375/106, 110; 307/269

[56] References Cited

U.S. PATENT DOCUMENTS

| 3,587,043 | 6/1971 | Mengani | 371/47 |
| 3,842,399 | 10/1974 | Kneuer et al. | 375/110 |
| 3,938,086 | 2/1976 | Valbonesi | 371/42 |
| 4,218,770 | 8/1980 | Weller | 375/110 |
| 4,361,898 | 11/1982 | Griffiths et al. | 375/114 |

FOREIGN PATENT DOCUMENTS

1287093 of 0000 United Kingdom .
1360148 of 0000 United Kingdom .
1374357 of 0000 United Kingdom .
1409184 of 0000 United Kingdom .
1410921 of 0000 United Kingdom .
1468999 of 0000 United Kingdom .
1507093 of 0000 United Kingdom .

Primary Examiner—Charles E. Atkinson
Attorney, Agent, or Firm—Victor R. Beckman

[57] ABSTRACT

Method and apparatus for transferring digital data in a bit stream consisting of digital data words each of which words includes data bits and a parity bit are disclosed. Except for the word parity bits, the stream is transferred without additional overhead bits such as start and stop bits employed in an asynchronous transmission data format or synchronizing characters employed in a synchronous transmission data format. Method and apparatus for locking onto the parity bit of such a bit stream are disclosed which allow for digital data transfer in this format.

25 Claims, 6 Drawing Figures

DIGITAL DATA TRANSMISSION WITH PARITY BIT WORD LOCK-ON

ORIGIN OF THE INVENTION

The Government has rights to this invention pursuant to Contract Number N01-NS-3-2322.

BACKGROUND OF THE INVENTION

Present digital data communication systems for transferring digital data generally are classified either as synchronous or asynchronous systems. Asynchronous transmission involves sending equal length bursts of data, with a common data character format for this purpose comprising a start bit, the data bits (with or without a parity bit) and one or more stop bits. No clock information is sent with the data since the receiver easily resynchronizes at the beginning of each character. A large percentage of overhead bits are required for asynchronous transmission.

Synchronous transmission involves sending blocks of data bits together with synchronizing, or framing, characters at, say, one hundred byte intervals of data. With synchronous transmission, much lower percentage of overhead bits are required. Now, however, the data must include therein the synchronizing, or framing, characters. Also, much more complex error checking schemes are required for synchronous systems compared to asynchronous systems if the loss of large blocks of information is to be avoided when transmission errors occur and synchronization is lost. With the present invention, the only overhead bits required are word parity bits which often are transmitted in any case.

Reference here is made to copending U.S. Pat. Application Ser. No. 311,782 filed concurrently herewith and assigned to the same assignee as the present invention.

SUMMARY OF THE INVENTION AND OBJECTS

An object of this invention is the provision of improved method and means for transferring data in the form of a bit stream consisting of words comprising data bits and a parity bit without the need for synchronizing or framing characters, start and stop bits, or the like.

An object of this invention is the provision of parity bit word lock-on method and means for generating word clock pulses in response to a bit stream of the above-mentioned type synchronized with word parity bits included in the stream.

The above and other objects and advantages of this invention are achieved by adding a parity bit to digital data bits to provide a serial bit stream consisting of equal length words each of which comprises a plurality of data bits and a parity bit. The signal is encoded and the encoded signal is transferred to a receiving location without accompanying word synchronization, clock, or timing signals. A "self-clocking" type code is employed for encoding the signal, which allows for the generation of bit clock pulses during decoding. At the receiving location bit clock pulses are generated and the signal is decoded returning the same to its original form i.e. a bit stream consisting of equal length words each of which consists of a plurality of data bits and a parity bit. The decoded output then is employed to generate word clock pulses synchronized with the parity bits. To generate the word clock pulses, a method of locking onto the parity bit of the bit stream is employed which includes parity checking word length groups of bits every bit interval to produce parity true and parity error signals when parity is correct and incorrect, respectively. All parity true signals and the first occurring parity error signals for each integral multiple word length group of bits (i.e. data bits plus the parity bit) are stored in memory means which is at least one word length in size. The stored parity signals are examined and a word clock pulse is generated in synchronization with the parity bit of the stream when only one parity true signal is stored in one word length portion of said memory means. When said portion of memory contains only parity error signals and no parity true signal, it is reloaded with all parity true signals and generation of word clock pulses is terminated until parity bit lock-on again is achieved.

The invention, together with other objects and advantages thereof will be better understood from the following description when considered with the accompanying drawings.

BRIEF DESCRIPTION OF THE DRAWINGS

In the drawings, wherein like reference characters refer to the same parts in the several views.

Figure 1:
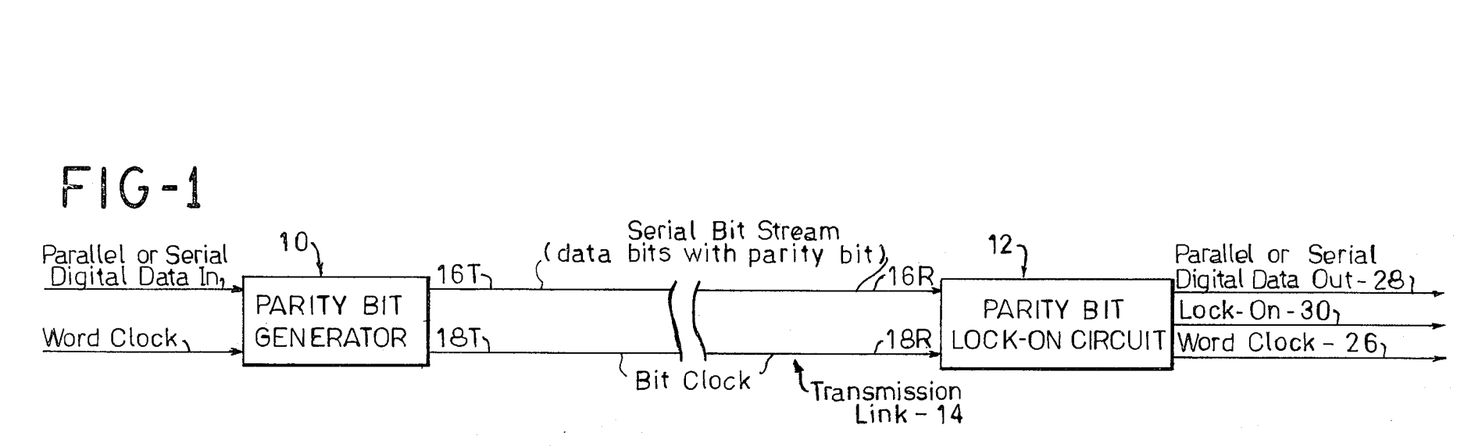
FIG. 1 is a simplified block diagram showing a digital data transmission system embodying the present invention.

Reference first is made to FIG. 1 wherein a system for transmitting and receiving a serial bit stream is shown in which the transmitter unit comprises a parity bit generator 10 and the receiver unit comprises a parity bit lock-on circuit 12, with the transmitter and receiving units being interconnected by a transmission line 14. Either serial or parallel digital data bits to be transmitted are supplied to the parity bit generator 10, together with word clock pulses from any desired suitable source thereof, not shown. As is well understood, an odd or even parity bit is added to the data bits, and a serial bit stream, consisting of equal length words each of which comprises data bits and a parity bit, is provided at the generator output line 16T. Bit clock pulses are available at a second output line 18T of the generator for clocking the data and parity bits from the generator.

Figure 2:
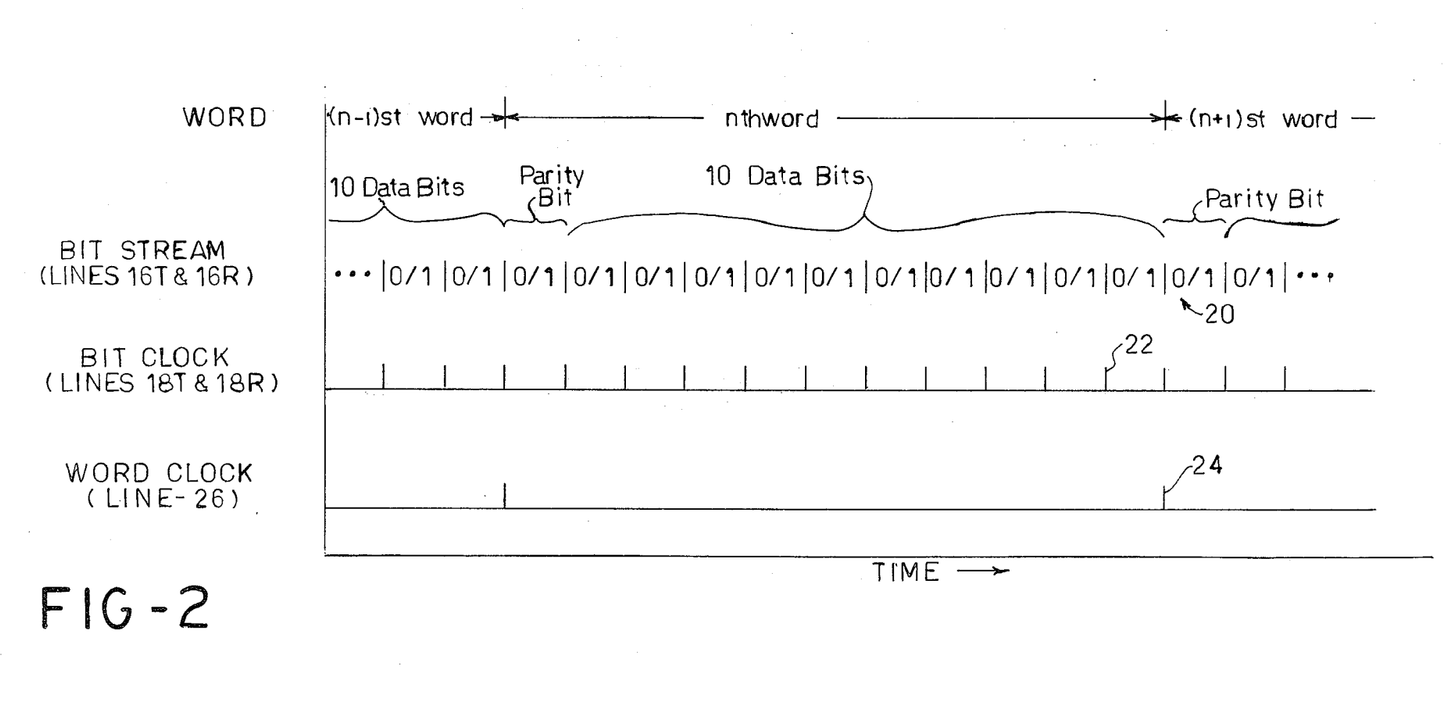
FIG. 2 includes a graphic representation showing the format of data from the parity bit generator included in FIG. 1 together with bit and word clock pulses for the data.

The parity bit generator outputs at lines 16T and 18T thereof are depicted in FIG. 2, to which reference also is made. The nth word together with portions of the (n−1)st and (n+1)st words at line 16T of the generator are shown, and identified by reference character 20. Each word of the serial bit stream comprises a plurality of data bits, here ten, together with a parity bit. In the present specification and claims, the term "word" is used to identify data bits plus the associated parity bit.

Thus, in the illustrated arrangement a stream of eleven (11) bit words is shown, each of which words consists of a plurality of data bits (here, ten), and a parity bit. In the illustrated arrangement, the parity bit proceeds the data bits in the stream. It may, if desired, follow the data bits in the bit stream, or be located at any position in the bits of the data word. The number of data bits in each word is not limited to ten, of course, although words of equal length are required. Bit clock pulses 22 are shown synchronized with the stream bits.

The serial bit stream is transmitted to the receiver unit by any suitable means, including the illustrated transmission line 14. For example, the stream may be encoded, and the encoded signal transferred to a receiver having a decoder to return the signal to its original form. In FIG. 1, bit clock pulses are shown supplied to the receiver over line 18R. Where encoding is employed, a code of the "self-bit-clocking" type may be employed to avoid the need to actually transmit the bit clock. With self-bit-clocking codes, bit clock signals are generated by the decoder from the transmitted data bit stream without a bit clock pulse input to the decoder. Such an arrangement is shown in FIG. 3A and 3B, described below.

Whether bit clock pulses are actually transmitted, or are generated at the receiver, the original serial bit stream is reproduced at the receiver and supplied as an input to the parity lock-on circuit 12 thereof, together with a bit clock for clocking the stream to the circuit 12. Thus, the word stream 20 and bit clock 22 shown in FIG. 2 depict output from the parity bit generator 10 and input to the parity lock-on circuit 12.

The parity lock-on circuit 12, in response to the serial bit stream clocked thereto by bit clock 22, generates word clock pulses 24, shown in FIG. 2, at output line 26 thereof, synchronized with data output at line 28 of circuit 12 available in either serial or parallel form. A third output, not shown in FIG. 2, is provided at line 30 from the parity lock-on circuit to signal when the circuit is locked onto the parity bit of the data stream. Details of parity bit lock-on are provided hereinbelow. For present purposes, it will be seen that with the novel system of this invention, no word synchronization or framing pulses, employed in conventional synchronous transmission systems, are required to be transmitted for word synchronization. Similarly, no start and stop bits included in conventional asynchronous transmission systems are required to be transmitted for word synchronization. With the present invention, wherein a bit stream consisting of data bits with a parity bit is transmitted, the transmission of overhead bits is minimized. Since a parity bit often is appended to data bits for data transmission, with the present invention, data is transferred with no additional overhead bits. It will be seen, then, that the system of the present invention comprises, essentially, a synchronous transmission system in which word synchronization is embedded in the data which it is desired to transmit.

Figure 3A:
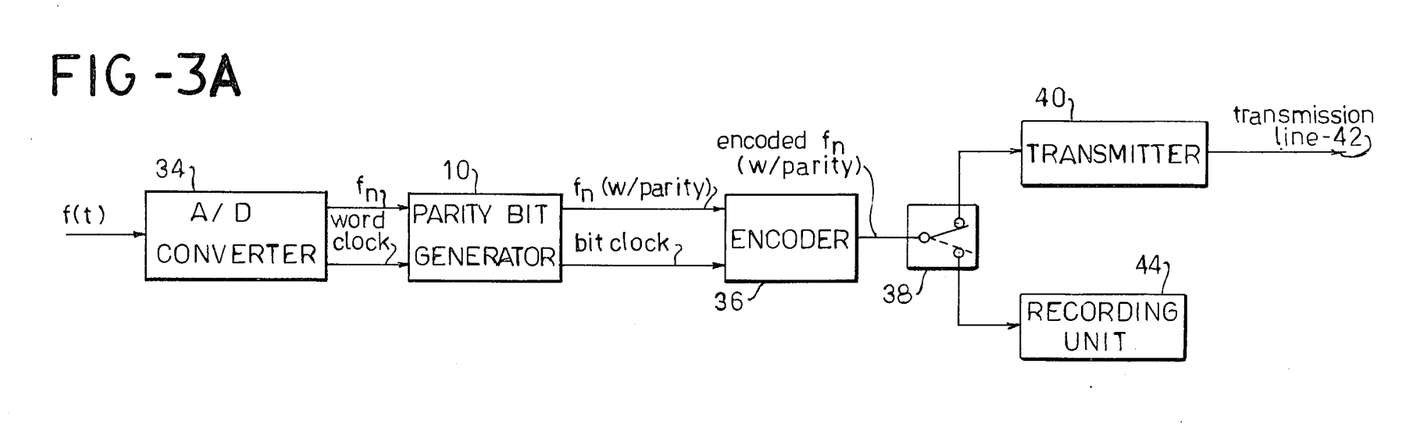
FIG. 3A and 3B together show a block diagram of a digital transmission and receiving system which embodies the present invention; a transmitter unit being shown in FIG. 3A and a receiving unit being shown in FIG. 3B.
Figure 3B:
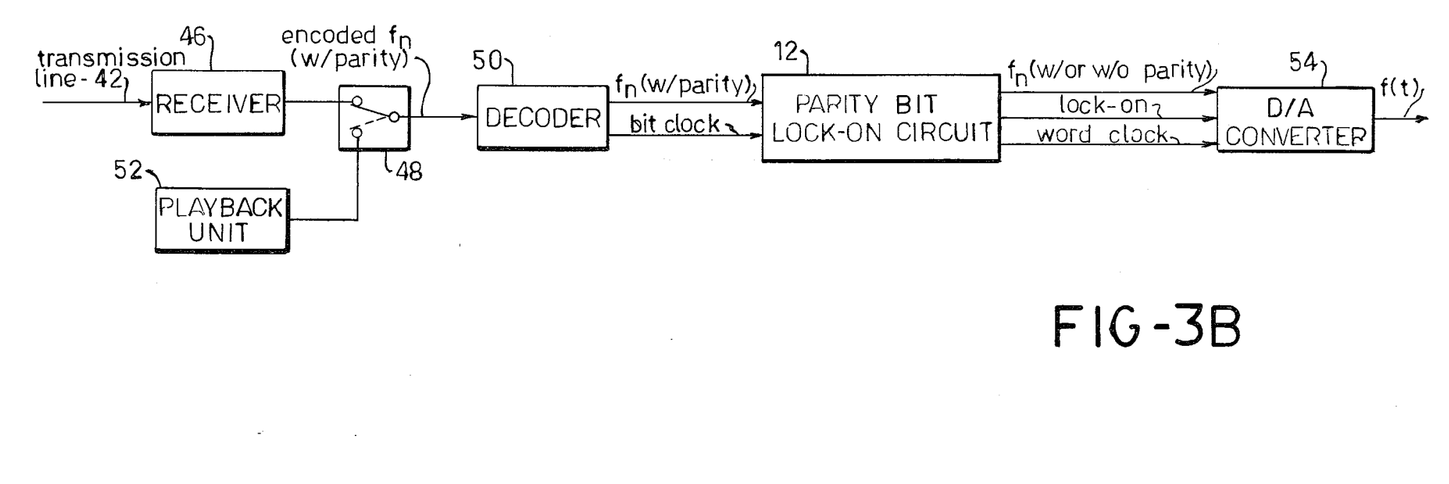

Reference now is made to FIG. 3A wherein a transmitter unit is shown for transmission of an analog signal f(t) from a source, not shown, to a remote location. The analog input signal f(t) is converted to digital form by an analog to digital converter 34, the $n^{th}$ sample of the analog to digital converter output being identified as $f_n$ in FIG. 3A. The analog to digital converter output, $f_n$, in either serial or parallel format, together with a word clock output, is supplied to a parity bit generator 10 where a parity bit is appended to the data bits. The data bits, with parity, together with a bit clock from the parity bit generator are fed to an encoder 36 for encoding. Numerous coding schemes for encoding digital data are known. With the present arrangement, a self-bit-clocking code is employed which, during decoding, is used to generate bit clock pulses for shifting the decoded signal from the decoder. Using a self-bit-clocking code, the encoder output simply comprises a serial bit stream consisting of encoded data bits with parity. The Miller code is an example of a self-bit-clocking code. Other such codes include the Bi-Phase codes such as Bi-Phase-Level, Bi-Phase-Mark and Bi-Phase-Space. A further advantage in the use of the Miller code for encoding at encoder 36 is that it requires a relatively low bandwidth for a given bit rate.

The encoded signals from encoder 36 are transmitted to remote receiver and/or are recorded. For transmission of digital data, angle modulation schemes often are employed such as frequency-shift-keying, phase modulation, or the like. In FIG. 3A, the encoder 36 output is shown connected through a switch 38 to a transmitter 40 for transmission over transmission line 42 to remote receiver. With the switch 38 in the other, broken line, position, the encoder 36 output is supplied to a recording unit 44 for recording of the encoded signals.

Signals transmitted over line 42 are received at receiver 46, shown in FIG. 3B, where they are demodulated for recovery of the encoded signals from the transmitter 40. The receiver 46 output, comprising the encoded digital signal, is supplied through a switch 48 to a decoder 50 for decoding the encoded signals, and for generation of bit clock signals synchronized with output bits from the decoder.

Recorded encoded digital signals, such as those recorded at recording unit 44, FIG. 3A, may be supplied to the decoder 50 for decoding and subsequent processing. With the switch 48 in the broken line position, signals are supplied to the decoder 50 from a playback unit 52. As noted above, since a self-bit-clocking code is employed in encoding the signals, no extra channel for recording of a bit clock is required. Furthermore, no channel for recording of a word clock is required since word clock signals are generated by means of the parity bit lock-on circuit 12 to which the signal and bit clock outputs from the decoder 50 are supplied.

In FIG. 3B, the outputs from the parity bit lock-on circuit 12 include actual sample signals $f_n$ with parity bit, or sample signals from which the parity bit has been stripped, a lock-on signal to signal whether or not the circuit is locked onto the parity bits of the word stream supplied thereto, and word clock pulses whenever the circuit is locked onto the parity bits. A digital-to-analog converter 54 responsive to outputs from the parity bit lock-on circuit 12 converts the signal samples $f_n$ to analog form, and any desired use may be made of the analog output from the converter 54.

Figure 4:
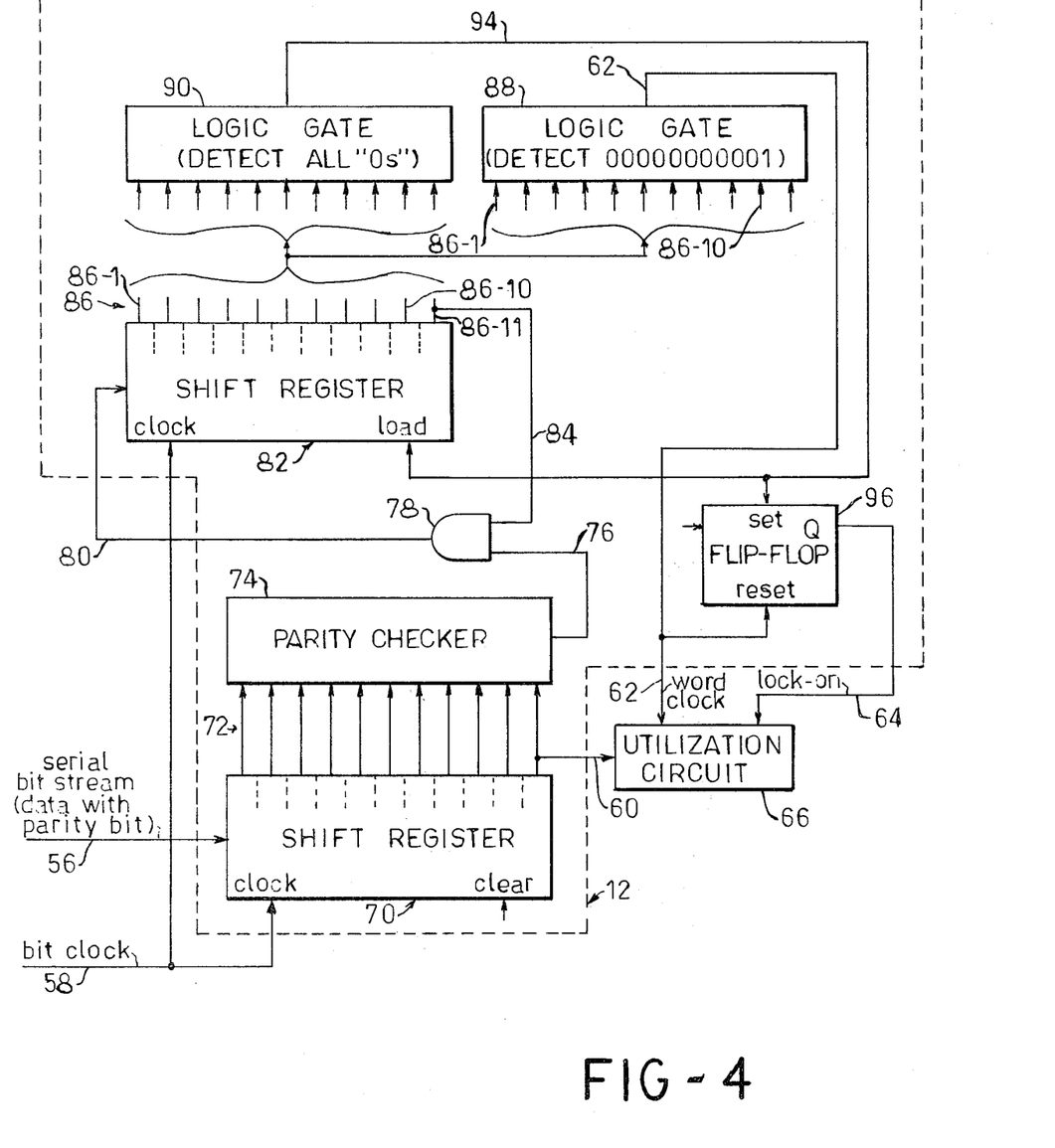
FIG. 4 is a block diagram of a novel parity bit lock-on circuit embodying the present invention and which may be employed in the systems shown in FIG. 1 and FIGS. 3A and 3B.

Reference now is made to FIG. 4 wherein details of a parity bit-lock-on circuit 12 are shown. A serial bit stream which consists of equal-length words, each of which words consists of data bits and a parity bit, is supplied to the parity bit lock-on circuit over line 56. A bit clock signal input at line 58 provides circuit timing. Outputs from the parity bit lock-on circuit include data at line 60, word clock signals at line 62 synchronized with parity bits of the data output at line 60 whenever the circuit is locked onto such parity bits as indicated by a lock-on signal at line 64. These outputs are shown supplied to a utilization circuit 66.

The word stream of data bits with a parity bit at line 56 is supplied to the serial input of first shift register means 70 having a capacity which is one or multiple words in length. In the illustrated arrangement wherein word stream 20 (FIG. 2) consisting of words having ten (10) data bits and one (1) parity is employed, shift register means 70 having a capacity which is an integral multiple of eleven (11) bits is employed, and in FIG. 4 an eleven (11) bit capacity shift register means 70 is shown. The serial output from the shift register is connected to output line 60 of the parity bit lock-on circuit 12. In the illustrated arrangement, the bit stream 20 simply is shifted through the shift register 70 under control of bit clock pulses 22 at clock input line 58.

The parallel output lines 72 of shift register means 70 are connected to parallel inputs of parity checker means 74 for checking parity of the eleven (11) bits contained in the register. Either even or odd parity checker means 74 is employed depending upon which parity system, i.e. an even or odd parity system, is employed. As the bit stream is shifted into register 70, parity is checked at each bit interval and, depending upon the results of the parity check a parity "true" or a parity "error" signal is produced at the output line 76 of the parity checker comprising a 1-bit or a 0-bit, respectively.

The output of parity checker 74 is connected over line 76 to one input of a logic gate 78 shown comprising an AND gate. The AND gate output at line 80 is connected to the serial input of a second shift register means 82, with the serial output from said register being connected over line 84 to the second input of said AND gate 78. The second shift register means 82 is of the same capacity as register 70, here eleven (11) bits. The shift register 82 is clocked by bit clock pulses 22 (FIG. 2) at the same rate as shift register 70. When the output from the shift register is a 1-bit, either a 1-bit or 0-bit is shifted into register 82 depending whether the output from the parity checker is a 1-bit or a 0-bit. It here will be noted that in the present description "one" and "zero" bits are not always represented by high and low signals, respectively. Thus, the "one" and "zero" signals may be represented by either a high or low signal. For an understanding of the block diagram showing of the invention of FIG. 4, it is not required that a single convention for representing the binary digits be employed.

The parallel outputs 86 from shift register means 82 are connected to first and second logic gate means 88 and 90, respectively. Output line 62 from logic gate 88 is a "one" when input lines 86-1 through 86-10 are "zeros" and line 86-11 is a "one". With any other combination of inputs, the logic gate 88 output is "zero". Output line 94 from logic gate 90 is a "one" when all input lines 86-1 through 86-11 are "zero". With any other combination of inputs, i.e. if any one or more input lines is a "one" the output from logic gate 90 is "zero".

When the parity bit lock-on circuit 12 locks onto a parity bit in the word bit stream supplied thereto, a word clock pulse synchronized with the parity bit is provided at output line 62 from the logic gate 88. The word clock pulse is supplied to the reset terminal of a flip-flop 96 to reset the flip-flop if it is in a set condition. When reset, the Q output goes to a true level which is connected over line 64 to the utilization circuit 66 to signal that the circuit 12 is locked onto the parity bit. The output from logic gate 90, which detects when all eleven (11) bits contained in the shift register 82 are "zeros" is connected to the load input terminal of the shift register 82 to load the same with all 1-bits.

Figure 5:
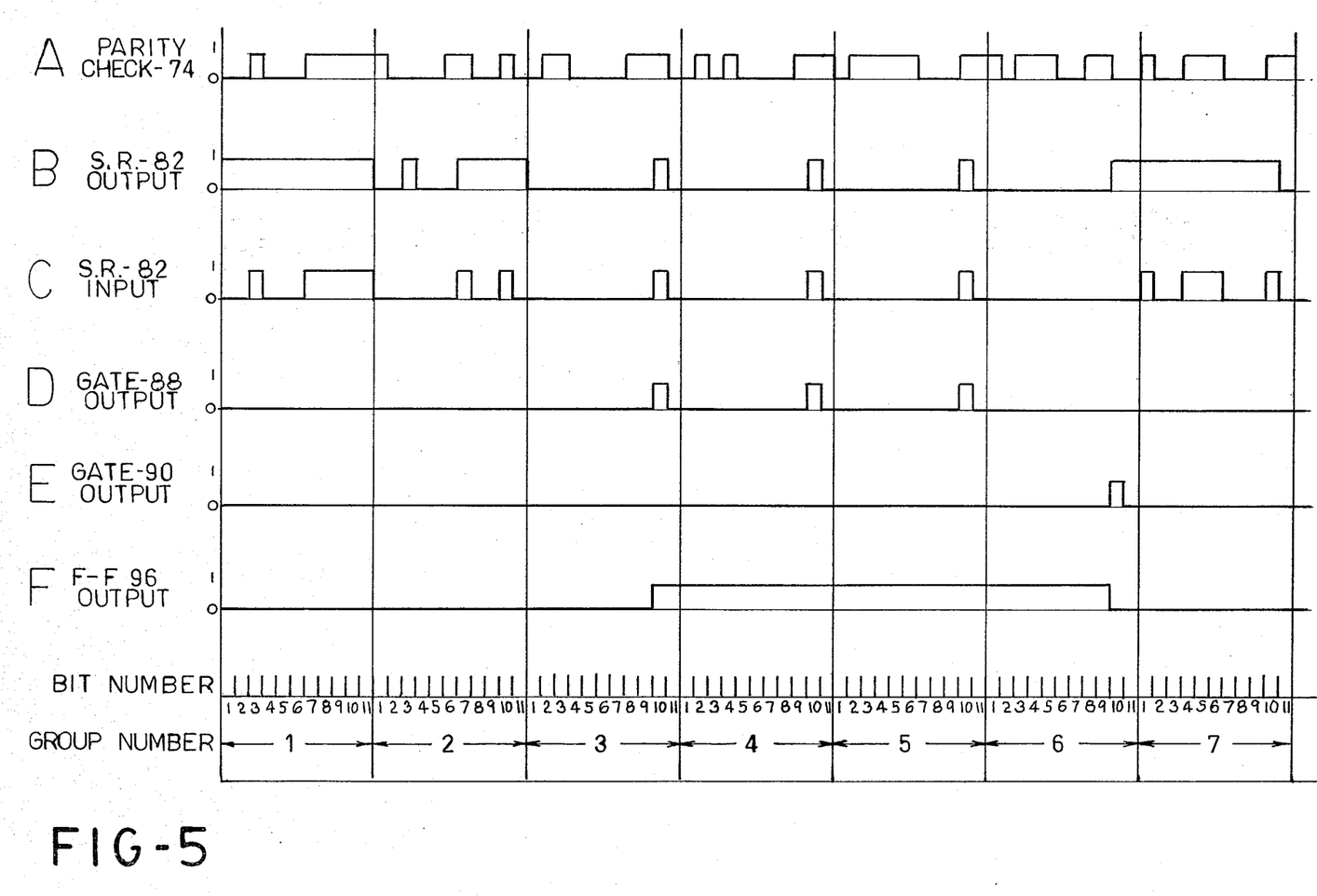
FIG. 5 shows signals appearing at various locations of the parity bit lock-on circuit shown in FIG. 4 for use in explaining operation thereof.

Operation of the parity bit lock-on circuit 12 will best be understood with reference to the waveforms of FIG. 5. Bits of the waveforms are shown divided into arbitrary bit groups 1 through 7, with each group consisting of eleven (11) bits numbered 1 through 11. Since each word in the data pulse train consists of ten (10) data bits and a parity bit, it is known that ten of the eleven bits in each group comprise data bits and one comprises the parity bit onto which the circuit locks. Until parity lock-on is achieved, it is not known which bit in the group comprises the parity bit.

Assumme that the shift register 82 is loaded with all "one" bits. Consequently, as bits are clocked through the register 82, the serial output from the register at line 84 to AND gate 78 will be a 1-bit for at least the first eleven (11) bits. With a 1-bit at line 84 to the AND gate, the gate output at line 80 is a 1-bit if the parity checker output also is a 1-bit (parity true), and is a 0-bit if the parity checker output is a 0-bit (parity error). In FIG. 5, when bit number 1 of bit group 1 is shifted into data shift register 70, a parity check of the eleven bits then in the register results in a "zero", parity error, output from the parity checker 74, waveform A. As a result, the output from AND gate 78 is "zero", which output is shifted into register 82, waveform C. The next input bit is shifted into data register 70, the parity of the eleven (11) bits contained therein again is checked and, as seen at waveform A, produces a parity checker output of "zero" which is shifted into register 82 through AND gate 78. At bit number 3 of bit group 1, the parity checker output is a 1-bit, i.e. true, which "ones" signal is transferred to the input of register 82 through AND gate 78; the gate 78 being enabled by the "ones" output from shift register 82 at this time, as seen at waveform B. As seen in FIG. 5, waveform A, parity checker outputs of "zero" are produced when checking the contents of data register 70 when bits 1, 2, 4, 5 and 6 are shifted into the register, and parity checker outputs of "one" (i.e. parity true) are produced when bits 3, 7, 8, 9, 10, and 11 are entered into register 70. Now, at bit 1 of bit group 2, the output from shift register 82 is "zero" (waveform B) whereby one input to AND gate 78 is "zero" for "zero" output from the gate which is entered into the shift register 82. In this case, regardless of the output from the parity checker 74, a "zero" at the serial output of the register 82 results in a "zero" being entered into the register. Essentially, then, it will be seen that parity is checked, and the result of such parity checking is entered into register 82, only so long as prior integral multiple groups of bits have produced parity "true" outputs.

Upon shifting all of the group 1 bits into data register 70, on the average, parity will check true for one half the parity checks. In the illustrated arrangement parity checked true when the six bits 3, 7, 8, 9, 10 and 11 of group 1 were entered. Now, as group 2 bits are shifted into the data register 70, parity is, essentially, checked only upon entry of bits 3, 7, 8, 9, 10 and 11, for which parity checked true during parity checking of corresponding group 1 bits. Of these group 2 bits, a parity checker output of "zero" is produced when bits 3, 8, 9 and 11 are entered into the data register, and a parity checker output of "one" is produced when bits 7 and 10 are entered (see waveform A). These "zeros" and "ones" are entered into shift register 82 through AND gate 78. For all other bits, a "zero" is reentered into register 82 since the output from register 82 is "zero". Now as group 3 bits are entered into the data register 70, parity is, essentially, checked only as bits 7 and 10 are entered. From waveform A, it will be seen that the parity bit generator output is zero at bit of group 3 whereby a "zero" is entered into shift register 82. Now, shift register 82 contains a single "ones" bit, here bit 10, while the remainder are "zero" bits. When this "ones" bit is shifted into the final stage of register 82, an output is obtained from logic gate 88, waveform D, which is synchronized with the parity bit. Output from logic gate 88 resets flip-flop 96 (waveform F) to signify that parity bit lock-on is achieved. A "ones" bit is reinserted into the shift register 82 so long as the parity checker output is true, i.e., is a "one" when the single "ones" contained in shift register 82 is located at the last register stage. Parity checking occurs every eleven bits at which time the logic gate 88 produces a "ones" output if parity is true.

If, after lock-on, parity fails to check, i.e. if the parity generator output is "zero" when the parity bit is checked, the AND gate 78 output is "zero" which "zero" is entered into the shift register 82. Now every stage of shift register 82 is loaded with a "zero" bit, whereupon a "one" output is produced by logic gate 90, waveform E. As noted above, this output sets flip-flop 96, waveform F, to indicate that circuit 12 no longer is locked onto the parity bit. The output from logic gate 90 also is supplied as a load signal to shift register 82 to load the register with all "ones". The operation continues, in the manner described above, until only a single "ones" bit is contained in the shift register 82 at which time a word-clock is produced at the output of logic gate 88 every time the "ones" bit reaches the final stage of the register.

A statistical analysis of the probability of parity bit lock-on after lock-on has been lost and shift register 82 is loaded with all "ones" now will be provided. During this lock-on procedure the first M bits are checked for parity (assume an (M-1) bit A/D conversion). The probability of a correct check when the bit is not a true parity bit is 0.5. Parity is checked in the next set of M bits only if the corresponding bit in the first set checked positive (e.g., if only the first, fifth and sixth bits checked positive in the first set, then only the first, fifth, and sixth bits are checked in the second set). This procedure is continued with successive sets of M bits until only one bit in a set requires a check, i.e., only one "slot" has checked positive in all sets. The slot is assumed to contain the true parity bit.

The probability of parity check N in a non-parity bit slot is $2^{-N}$, and the probability that such a slot is correctly classified non-parity after N tries is $(1-2^{-N})$. The probability that all M-1 non-parity slots are correctly classified after N tries is $(1-2^{-N})^{M-1}$. Therefore, the probability, $P_I$, that one or more of the non-parity slots are incorrectly classified after N tries is:

$$P_I = 1-(1-2^{-N})^{M-1}. \quad (1)$$

This is the probability that lock-on has not occurred after N. Table 1 shows $P_I$ for M=11 and various values of N.

The probability of lock-on at exactly N tries is the probability that some non-parity slots were incorrectly classified after (N-1) tries times the probability that all were correctly classified after N tries, i.e., $$P(N) = [1 - (1 - 2^{-N+1})^{M-1}](1 - 2^{-N})^{M-1} \text{ for } N \geq 2 \quad (2)$$

-continued $$= 2^{-M+1} \text{ for } N = 1.$$

TABLE 1

| PROBABILITY OF NO LOCK-UP AFTER N TRIES (M = 11) | |
|---|---|
| N | $P_I$ |
| 1 | 0.999 |
| 2 | 0.944 |
| 3 | 0.737 |
| 4 | 0.476 |
| 5 | 0.272 |
| 6 | 0.146 |
| 7 | 0.075 |
| 8 | 0.038 |
| 9 | 0.019 |
| 10 | 0.010 |
| 11 | 0.005 |
| 12 | 0.002 |

Table 2 gives P(N) for different values of N and M=11. The expected value of N, E(N), is given by:

$$E(N) = \sum_{N=1}^{\infty} N P(N) \quad (3)$$

$$= 2^{-M+L} + \sum_{N=2}^{\infty} N(1 - 2^{-N})^{M-1} [1 - (1 - 2^{-N+1})^{M-1}]$$

TABLE 2

| PROBABILITY OF LOCK-UP ON THE $N^{th}$ TRY (M = 11) | |
|---|---|
| N | P(N) |
| 2 | 0.0001 |
| 3 | 0.0529 |
| 4 | 0.0938 |
| 5 | 0.2494 |
| 6 | 0.1980 |
| 7 | 0.1246 |
| 8 | 0.0693 |
| 9 | 0.0373 |
| 10 | 0.0188 |
| 11 | 0.0099 |
| 12 | 0.0050 |

The quantity E(N) has been numerically evaluated for M=11 and is equal to 5.43.

The invention having been described in detail in accordance with requirements of the Patent Statues, various changes and modifications will suggest themselves to those skilled in this art. For example, data shifted into shift register 70 may be read out therefrom in parallel rather than in series, as shown. If desired, the parity bit may be stripped from the data bits simply by connecting to outputs from the first ten (10) stages of the register 70 and not the final stage. Also, it will be apparent that with minor modifications, operation of the parity bit lock-on circuit with a bit stream wherein the parity bit is positioned anywhere in the data bits, or after the data bits, rather than before the data bits, may be provided. It is intended that the above and other such changes and modifications shall fall within the spirit and scope of the invention as defined in the appended claims.

What is claimed is:

1. In an electrical system for transmission, recording and playback, or the like, of a serial bit stream, the combination comprising means for generating a serial bit stream of equal length words, each of which words is M bits in length and includes M-1 non-redundant information bits and a single parity bit, parity bit lock-on means, and means for transferring said serial bit stream from said generating means to said parity bit lock-on means, said parity bit lock-on means including means for parity checking at one bit intervals word length groups of bits of said serial bit stream transferred thereto from said generating means and for locking onto parity bits included in said serial bit stream.

2. In an electrical system as defined in claim 1 wherein said transferring means includes encoding means for encoding the bit stream from said generating means using a self-bit-clocking code, said encoding means having an encoded bit stream output, and decoding means for decoding the encoded bit stream from said encoding means to replicate the bit stream from the generating means and to generate bit clock pulses for clocking the replicated bit stream to said parity bit lock-on means.

3. In an electrical system as defined in claim 2 wherein said transferring means also includes a transmitter modulated by the bit stream output of said encoding means, and a receiver responsive to the output from said transmitter to demodulate the transmitted signal, the receiver output being supplied to said decoding means.

4. In an electrical system as defined in claim 2 wherein said transferring means also includes recording means for recording the bit stream output from said encoding means, and playback means for playback of the recorded bit stream to said decoding means.

5. In an electrical system as defined in claim 1 wherein said parity bit lock-on means includes means for producing word clock pulses synchronized with parity bits in the serial bit stream when locked onto parity bits in said serial bit stream.

6. In an electrical system as defined in claim 5 wherein said parity bit lock-on means includes means for producing a parity bit lock-on signal of one level when said parity bit lock-on means is locked onto parity bits in the serial bit stream and which is of another level when parity bit lock-on is lost.

7. In a method of transferring digital data from a first location to a second location without need for start-stop bits, framing or synchronizing characters, or the like, the steps including, generating at a first location a serial bit stream comprising equal length words M bits in length to be transferred to a second location, each of which words includes M−1 non-redundant information bits and a single parity bit, transferring the serial bit stream generated at the first location to a second location, and at said second location, recurrently parity checking at one bit intervals word length groups of the serial bit stream transferred thereto and, in response to said parity checking, locking onto parity bits in the stream.

8. In a method as defined in claim 7 which includes generating word clock pulses in synchronization with parity bits in the bit stream when locked onto parity bits in the stream.

9. In a method as defined in claim 8 which includes generating a lock on signal of one level when lock-on is achieved and of another level when lock-on is lost.

10. In a method of transferring digital data as defined in claim 7 including encoding the generated serial bit stream at said first location using a self-bit-clocking code to produce an encoded serial bit stream which is transferred to said second location, and decoding the encoded serial bit stream transferred to the second location for replication of the generated serial bit stream and for generation of bit-clock pulses for clocking said replicated serial bit stream.

11. In a digital data system, the combination comprising means for generating a serial bit stream consisting of equal length words M bits in length, each of which words includes M−1 non-redundant informaiton bits and a single parity bit, and parity bit lock-on means responsive to the serial bit stream from said generating means for checking word length groups of bits for parity at every bit interval and locking onto parity bits included in said bit stream and for generating word clock pulses synchronized with parity bits when locked onto parity bits.

12. In a digital data system as defined in claim 11 wherein said parity bit lock-on means includes means for generating a lock on signal which is of one level when said parity bit lock-on means is locked onto parity bits and is of another level when lock-on is lost.

13. Parity bit lock-on apparatus for use in locking onto parity bits included in a serial bit stream of equal length words which are M bits in length and each of which words includes M−1 information bits and a single parity bit, said apparatus comprising, means for checking word length groups of bits for parity every bit interval of the serial bit stream, and means responsive to said parity checking means for locking onto parity bits in the bit stream and generating word clock pulses in synchronization with parity bits during parity bit lock-on.

14. Parity bit lock-on apparatus for use in locking onto parity bits included in a serial bit stream of equal length words each of which words includes a parity bit, said apparatus comprising, means for parity checking word length groups of bits of the bit stream every bit interval, and means responsive to said parity checking means for locking onto parity bits in the bit stream and generating word clock pulses in synchronization with parity bits during parity bit lock-on, said means responsive to said parity checking means including shift register means of at least one word length in size and having a serial input, serial output, and parallel outputs, means under control of the serial output of said shift register means for shifting the output from said parity checking means into the serial input of the shift register means when the serial output from the shift register means is a 1-bit and for shifting a 0-bit into the serial input thereof when the serial output from the shift register means is a 0-bit.

15. Parity bit lock-on apparatus as defined in claim 14 including first means responsive to parallel outputs from said shift register means for producing a "one" output only when a given stage of said shift register means contains a 1-bit while other stages thereof contain 0-bits, which output is synchronized with parity bits in the serial bit stream.

16. Parity bit lock-on apparatus as defined in claim 15 including
second means responsive to parallel outputs from said shift register means for producing a "one" output only when every stage of said shift register means contains a 0-bit, and
means for loading all stages of said shift register means with 1-bits in response to the "one" output produced by said second means.

17. Parity bit lock-on apparatus as defined in claim 16 including
a flip-flop which is set in response to a "one" output from one of said first and second means and is reset by a "one" output from the other thereof, the flip-flop output being in a first state when the apparatus is locked onto parity bits and in second state when the apparatus is not locked onto parity bits.

18. Parity bit lock-on apparatus for use in locking onto parity bits included in a serial bit stream of equal length words each of which words includes a parity bit, said apparatus comprising,
means for parity checking word length groups of bits of the bit stream every bit interval,
shift register means of at least one word length in size into which the serial bit stream is shifted under control of bit clock pulses, said shift register means having parallel outputs connected to said parity checker means for parity checking word length groups of bits contained in said shift register means as each bit is shifted into said shift register means, and
means responsive to said parity checking means for locking onto parity bits in the bit stream and generating word clock pulses in synchronization with parity bits during parity bit lock-on.

19. Parity bit lock-on apparatus as defined in claim 18 wherein words of the parity bit stream each consist of data bits and a parity bit.

20. Parity bit lock-on apparatus for use in locking onto parity bits included in a serial bit stream of equal length words each of which words includes a parity bit, said apparatus comprising,
first shift register means of at least one word length in size and including a serial input and parallel outputs,
means for shifting the serial bit stream into said first shift register means,
parity checker means responsive to parallel outputs of said first shift register means for checking a word length group of bits as each bit is shifted into said first shift register means,
second shift register means of at least one word length in size and including a serial input, a serial output, and parallel outputs,
a logic gate having first and second inputs and an output,
means for connecting outputs from said parity checker means and serial output of said second shift register means to said first and second inputs of said logic gate,
means for connecting the output from said logic gate to the serial input of said second shift register means,
first gating means responsive to parallel outputs from said second shift register means for producing an output upon the simultaneous presence of a 1-bit at one selected parallel output and 0-bits at other parallel outputs, the output from said first gating means being produced in synchronization with the presence of a parity bit in the bit stream at a selected stage of said first shift register means.

21. Parity bit lock-on apparatus as defined in claim 20 including
second gating means responsive to parallel outputs from said second shift register means for producing an output upon the simultaneous presence of 0-bits at all parallel outputs, and
means responsive to the output from said second gating means for loading the second shift register means with 1-bits.

22. A method of locking onto parity bits included in a serial bit stream of equal length words, each of which words includes parity bit, said method including,
clocking the serial bit stream into the serial input of a first shift register which is at least one word length in size,
at one bit intervals, checking parity of a word length group of bits contained in said first shift register means to obtain a parity true or parity error signal when parity checks and fails to check, respectively,
supplying the parity signal to the serial input of a second shift register which is at least one word length in size whenever a selected stage of the second shift register contains a parity true signal, otherwise supplying a parity error signal to the second shift register regardless of the results of checking parity, and
producing a word clock pulse when a word length group of adjacent stages of the second shift register contain parity error signals in all but one given stage, and the one given stage contains a parity true signal.

23. A method of locking onto parity bits as defined in claim 22 including,
loading all stages of said second shift register with parity true signals whenever all stages of the word length group of adjacent stages contain parity error signals.

24. A method of locking onto parity bits of a serial bit stream comprising equal length words, each of which words includes a parity bit, said method including steps of
parity checking word length groups of bits every bit interval of the serial bit stream to produce parity true and parity error signals when parity checks and fails to check, respectively,
storing the results of parity checking for each word length group of bits so long as parity checking of prior integral multiple word length groups produced parity true signals, said storing of the results of parity checking being discontinued whenever parity checking of a prior integral multiple word length group produced a parity error signal,
when stored results of parity checking is true for only one multiple word length group of bits, producing a word clock pulse when parity checks true for each such group.

25. A method of locking onto parity bits as defined in claim 24 including,
producing a loss of parity lock-on signal whenever parity checking of the one remaining integral multiple group of bits results in a parity error signal, and
repeating the claim steps.

\* \* \* \* \*